(12) United States Patent
Goel et al.

(10) Patent No.: US 8,061,600 B2
(45) Date of Patent: Nov. 22, 2011

(54) WIRELESS DISPLAY TAG

(75) Inventors: Anurag Goel, Pleasanton, CA (US);
Sunit Saxena, Monte Sereno, CA (US);
Mark Douglas McDonald, Campbell, CA (US); Leonard Mark Dorfman, Santa Clara, CA (US)

(73) Assignee: Altierre Corporation, San Jose, CA (US)

( * ) Notice: Subject to any disclaimer, the term of this patent is extended or adjusted under 35 U.S.C. 154(b) by 0 days.

(21) Appl. No.: 11/019,978

(22) Filed: Dec. 20, 2004

(65) Prior Publication Data

US 2005/0152108 A1 Jul. 14, 2005

Related U.S. Application Data

(60) Provisional application No. 60/530,819, filed on Dec. 18, 2003, provisional application No. 60/530,818, filed on Dec. 18, 2003, provisional application No. 60/530,817, filed on Dec. 18, 2003, provisional application No. 60/530,816, filed on Dec. 18, 2003, provisional application No. 60/530,795, filed on Dec. 18, 2003, provisional application No. 60/530,790, filed on Dec. 18, 2003, provisional application No. 60/530,783, filed on Dec. 18, 2003, provisional application No. 60/530,823, filed on Dec. 18, 2003, provisional application No. 60/530,784, filed on Dec. 18, 2003, provisional application No. 60/530,782, filed on Dec. 18, 2003.

(51) Int. Cl.
*G06K 15/00* (2006.01)
(52) U.S. Cl. ........................... 235/383; 235/385
(58) Field of Classification Search .......... 235/383–385, 235/378; 340/5.91, 5.92, 10.1, 568.1, 572; 705/400, 20–22, 28–29
See application file for complete search history.

(56) References Cited

U.S. PATENT DOCUMENTS

| | | | |
|---|---|---|---|
| 3,609,741 A * | 9/1971 | Miller | 340/568.1 |
| 4,303,910 A | 12/1981 | McCann | |
| 4,740,779 A | 4/1988 | Clearly et al. | |
| 4,888,709 A | 12/1989 | Revesz et al. | |
| 4,896,319 A | 1/1990 | Lidinsky et al. | |
| 5,151,684 A * | 9/1992 | Johnsen | 340/568.1 |
| 5,241,467 A * | 8/1993 | Failing et al. | 705/1 |
| 5,243,696 A * | 9/1993 | Carr et al. | 715/765 |
| 5,465,085 A * | 11/1995 | Caldwell et al. | 340/5.91 |
| 5,473,146 A * | 12/1995 | Goodwin, III | 235/383 |
| 5,510,602 A * | 4/1996 | Evans et al. | 235/385 |
| 5,532,465 A * | 7/1996 | Waterhouse et al. | 235/383 |
| 5,539,393 A * | 7/1996 | Barfod | 340/825.52 |
| 5,668,560 A * | 9/1997 | Evans et al. | 343/702 |
| 5,686,902 A | 11/1997 | Reis et al. | |
| 5,729,695 A * | 3/1998 | Ahlm et al. | 705/20 |
| 5,751,257 A * | 5/1998 | Sutherland | 345/1.2 |
| 5,797,132 A * | 8/1998 | Altwasser | 705/16 |

(Continued)

*Primary Examiner* — Daniel St.Cyr
(74) *Attorney, Agent, or Firm* — DLA Piper LLP (US)

(57) ABSTRACT

A low-profile Wireless Display Tag (WDT) fits within the confines of a retail store display shelf-edge C-channel. The WDT may also be used to tag high-value retail item units where it can simultaneously function as a price tag, and an anti-theft device. The invention provides for bidirectional communication between the WDT and a central database. The invention uses a low profile antenna that may be painted onto a surface within the WDT. The WDT is capable of displaying graphics or variable format alphanumeric characters and the placement of display items is user programmable. The WDT uses an RF integrated Circuit (RFIC) that combines the backscatter RF communications method, amplified backscatter RF communications method and the active RF communications method.

24 Claims, 6 Drawing Sheets

U.S. PATENT DOCUMENTS

| | | |
|---|---|---|
| 5,821,523 A | 10/1998 | Bunte et al. |
| 5,873,025 A * | 2/1999 | Evans et al. .................. 455/63.1 |
| 6,058,292 A | 5/2000 | Terreault |
| 6,097,301 A * | 8/2000 | Tuttle .......................... 340/693.9 |
| 6,253,190 B1 * | 6/2001 | Sutherland ..................... 705/20 |
| 6,269,342 B1 * | 7/2001 | Brick et al. .................... 705/20 |
| 6,307,919 B1 * | 10/2001 | Yoked ........................... 235/385 |
| 6,420,961 B1 * | 7/2002 | Bates et al. .................. 340/10.1 |
| 6,715,675 B1 * | 4/2004 | Rosenfeld ..................... 235/383 |
| 7,090,125 B2 * | 8/2006 | Goel et al. .................... 235/383 |
| 2002/0042741 A1 | 4/2002 | Wilson, III et al. |
| 2002/0122467 A1 | 9/2002 | Camp, Jr. et al. |
| 2003/0104848 A1 | 6/2003 | Brideglall |
| 2005/0025218 A1 | 2/2005 | Briles |
| 2005/0057341 A1 | 3/2005 | Roesner |

\* cited by examiner

Prior Art

WIRELESS DISPLAY TAG

RELATED APPLICATIONS

The present invention claims the benefit of priority from the following United States provisional applications: U.S. patent Ser. No. 60/530,819 filed Dec. 18, 2003 entitled "Wireless Display Tag (WDT) Using Amplified Backscatter"; U.S. patent Ser. No. 60/530,818 filed Dec. 18, 2003 entitled "Wireless Display Tag (WDT) Using an Active Transmitter"; U.S. patent Ser. No. 60/530,817 filed Dec. 18, 2003 entitled "Wireless Display Tag (WDT) Using an Active Receiver"; U.S. patent Ser. No. 60/530,816 filed Dec. 18, 2003 entitled "Wireless Display Tag (WDT) Using an Active Transmitter and Diode Receiver"; U.S. patent Ser. No. 60/530,795 filed Dec. 18, 2003 entitled "Wireless Display Tag (WDT) Using Active and Backscatter Transceivers"; U.S. patent Ser. No. 60/530,790 filed Dec. 18, 2003 entitled "Wireless Display Tag (WDT) Unit"; U.S. patent Ser. No. 60/530,783 filed Dec. 18, 2003 entitled "RF Backscatter Transmission with Zero DC-Power Consumption"; U.S. patent Ser. No. 60/530,823 filed Dec. 18, 2003 entitled "Wireless Display Tag (WDT) Initialization; U.S. patent Ser. No. 60/530,784 filed Dec. 18, 2003 entitled "Wireless Display Tag (WDT) with Environmental Sensors"; U.S. patent Ser. No. 60/530,782 filed Dec. 18, 2003 entitled "High Readability Display for a Wireless Display Tag (WDT)"

This application is also related to the following US utility applications filed simultaneously herewith: U.S. patent Ser. No. 11/019,660, filed Dec. 20, 2004 entitled "Error Free Method for Wireless Display Tag (WDT) Initialization"; U.S. patent Ser. No. 11/019,494, filed Dec. 20, 2004 entitled "RF Backscatter Transmission with Zero DC Power Consumption"; U.S. patent Ser. No. 11/019,976, filed Dec. 20, 2004 entitled "Wireless Display Tag (WDT) Using Backscatter and Transceivers"; U.S. patent Ser. No. 11/019,916, filed Dec. 20, 2004 entitled "Multi User Wireless Display Tag (WDT) Infrastructure and Methods"; and U.S. patent Ser. No. 11/019,705, filed Dec. 20, 2004 entitled "Low Power Wireless Display Tag (WDT) Systems and Methods".

BACKGROUND OF THE INVENTION

1. Field of the Invention

Generally, the present invention relates to electronic inventory systems. Further, the present invention relates to electronic shelf labels and electronic inventory tags. More specifically, the present invention relates to electronic shelf labels and tags adapted to communicate wirelessly.

2. Description of Related Art

Referring to FIG. 1, retail stores typically display pricing information on paper labels located on shelf edges (shelf labels); FIG. 1 shows an example of a typical printed shelf label. Shelf labels are fitted into C-shaped channels at the edge of product display shelves. Typically, an in-store computer-based printing system downloads "Price Files" from a central location, such as a Retail Chain Headquarters. The information in Price Files is printed on shelf labels and these new shelf labels are manually inserted into the shelf C-channels, usually on a weekly basis. A typical large retail store must update thousands of shelf labels each week.

Referring now to FIG. 2, FIG. 3 and FIG. 4, some Electronic Shelf Labels (ESL) 10 have been produced in an effort to automate the shelf labeling process. As shown in FIG. 4, ESLs 10 display basic price information on a segmented liquid crystal display (LCD).

Referring to FIG. 2, ESLs 10 may receive display information by infrared (IR) or radio frequency (RF) communication 12. Current ESLs 10 often use unidirectional communications techniques to transmit data from the in-store computer-based pricing system to the deployed ESLs 10. Some ESLs 10 are capable of bidirectional communication, allowing the deployed ESLs 10 to send information or requests to the in-store computer system 14. Communication between an in-store computer system 14 and the deployed ESLs 10 is facilitated by one or more access points 16. Access points 16 are often located in the ceilings of the store.

Referring to FIG. 3, current ESLs 10 tend to have large and bulky form factors. Form factors are affected by the quantity and type of electronic components required to implement the chosen form of communication. Current ESLs 10 have a large, high-profile form-factor because they incorporate some combination of batteries, electronic devices, large sheet metal RF antennae and bulky mounting attachments. As a result, ESLs 10 extend beyond the confines of the shelf C-channel 18 and hence prone to damage resulting from incidental contact or collision with shoppers, staff, shopping carts, etc.

Referring now to FIG. 4 and FIG. 5, the content and format of displayable information is limited in current ESLs 10. Because current ESLs 10 use segmented LCDs to display price and other information 102, display formats are rigidly constrained to alphanumeric, non-graphical data. Segmented LCDs 102 also restrict the placement of displayable characters to predetermined positions on the display surface. These constraints and restrictions result in poor display readability and limited versatility of information displayed. Also, the limitations of LCD content, format and placement necessitate the use of printed labels 104 to augment the ESL 10, as shown in FIG. 4. The printed labels 104 carry store operations information, including stocking numbers, barcodes, and other static information.

Finally, current ESLs have limited functionality, and are generally capable of performing only basic functions. In-store computer systems control all device functionality. For example, devices must be commanded to disable or resume display operations or to otherwise reduce power consumption to conserve battery life. Problems occur if the commands from the central controller are not received or acknowledged by an ESL, or if the ESL is limited to unidirectional communications and is incapable of acknowledging commands and reporting status. Such problems may lead to failure of the electronic shelf labeling system, incorrect pricing or outdated information displays.

SUMMARY OF THE INVENTION

The present invention addresses various issues associated with prior art ESLs and enables the production of a low-profile Wireless Display Tag (WDT) that fits within the confines of shelf-edge C-channel on a retail store display shelf. WDTs may also be used to tag high-value retail item units where it can simultaneously function as a price tag, an inventory locating device and an anti-theft device.

The invention provides for bidirectional communication between the WDT and a central database using an RF integrated Circuit (RFIC) that combines the backscatter RF communications method, amplified backscatter RF communications method and the active RF communications method.

The invention also provides for wired serial communication between the WDT and any of a number of devices including, but not limited to, a handheld controller and an external visual display system.

The invention may use a low profile antenna. In some embodiments, the antenna is painted onto a surface within the WDT.

The invention may use both flexible and rigid paper-thin display elements to facilitate production of rigid and flexible WDTs. The display element is a dot-matrix display providing high-resolution programmable display formats. The WDT is capable of displaying graphics or variable format alphanumeric characters and the placement of display items is user programmable. In some embodiments, machine-readable barcodes may be displayed by virtue of the use of the dot matrix display in a user programmable fashion. Certain embodiments use active-matrix LCD, passive-matrix LCD and other display technologies.

The invention may derive power from a combination of battery and solar cell sources. The battery may supply power for a portion of the RFIC. In some embodiments, the RFIC includes digital logic, volatile and non-volatile memory, display driver and analog RF circuitry. The battery supplies power for the RF analog circuitry, digital logic and volatile memory within the RFIC. When store lighting is sufficient to permit shopping or after-hours shelf stocking activity, the solar cell may provide sufficient power to operate the display and parts of the RFIC, including the digital logic, volatile memory and display driver portions. When the lighting level drops below a predetermined level, the WDT may conserve battery power by reducing functionality and disabling the display. In such low-light conditions, the battery supplies sufficient power to maintain data stored in the volatile memory. When lighting is increased above a predetermined level, the WDT may resume normal display operation.

In some embodiments, low light conditions may be determined based on the minimum light required to operate a retail store, as when overhead lights are extinguished. When lighting is restored, the WDT may detect the increased solar cell power generation and enables the display element.

In some embodiments, the solar cell element may form the back plane of the display element—thus presenting maximum surface area for the most-efficient photon collection, as well as maximizing the WDT facing for display purposes (FIG. 11).

Embodiments of the WDT have a low profile and a compact surface area, suitable for mounting on C-channels of a retail store display shelf. A low-profile form-factor of the WDT is possible, in part, because the WDT may use a single component containing the RF circuitry and a low profile RF antenna that, in some embodiments, is created by painting a pattern on a suitable WDT surface. In addition to thinness, certain embodiments may use flexible display elements to enable flexible WDTs to be produced.

The WDT may be initialized through communication with in-store computer systems using an error-free process for initialization of the WDT as disclosed in the concurrently filed U.S. Provisional Patent Application titled "An Error Free Method for Wireless Display Tag Initialization," incorporated herein by reference. The WDT may maintain a unique identifier (ID) that is stored in volatile or non-volatile memory. The volatile memory may be continuously supplied with power and refreshed to maintain the integrity of the WDT's ID. An in-store central application server or controller may maintain a database linking the WDT IDs to a retail item's UPC number.

Environmental sensors can be built into WDTs to monitor temperature, humidity, etc. If the environmental conditions move outside the pre-determined limits, then the WDT can transmit via RF that alarm condition to a central computer. A sample circuit for detecting temperature is shown in FIG. 14.

The invention has various advantages:

First, a variety of store operations information may be maintained by the WDT and displayed upon request by store staff. While the pricing screens are always visible by default, staff may temporarily change the display to store operations information screens using a hand-held terminal.

Second, graphical information, including barcodes may be displayed as part of store operations screens.

Third, the invention may serve as an anti-theft device. Because the WDT communicates with a central controller, its location can be determined by the communication network. Hence, if the WDT is attached to a product for sale or other movable item, the product or item can be tracked and the detection of absence or presence of the product or item in an area of the store can be used to trigger an alarm system.

Fourth, in an embodiment of the invention, the displayable area may extend to the edges of the WDT, allowing multiple contiguously positioned WDTs to function as a single, large display.

Fifth, embodiments of the WDT may assist store management and staff by providing store operational data on demand. Information concerning physical location of products, inventory levels, stocking numbers may be stored in the WDT. The WDTs may display information regarding store operation and control on demand. Access to the information can be provided on command from the central controller or on command from authorized handheld wireless terminals. Store communications can be improved because the central control system can command WDTs to display a range of symbols for the attention of staff or management to facilitate their implementation of certain store operation functions such as stocking and inventory management.

Sixth, the invention can monitor the environment, such as temperature, humidity. If the parameters exceed the allowed bounds, then the store can be alerted to correct a potential issue before it becomes a problem.

DETAILED DESCRIPTION OF A PREFERRED EMBODIMENT OF THE INVENTION

Figure 1:
FIG. 1 shows a prior art example shelf label printed on paper.
Figure 2:
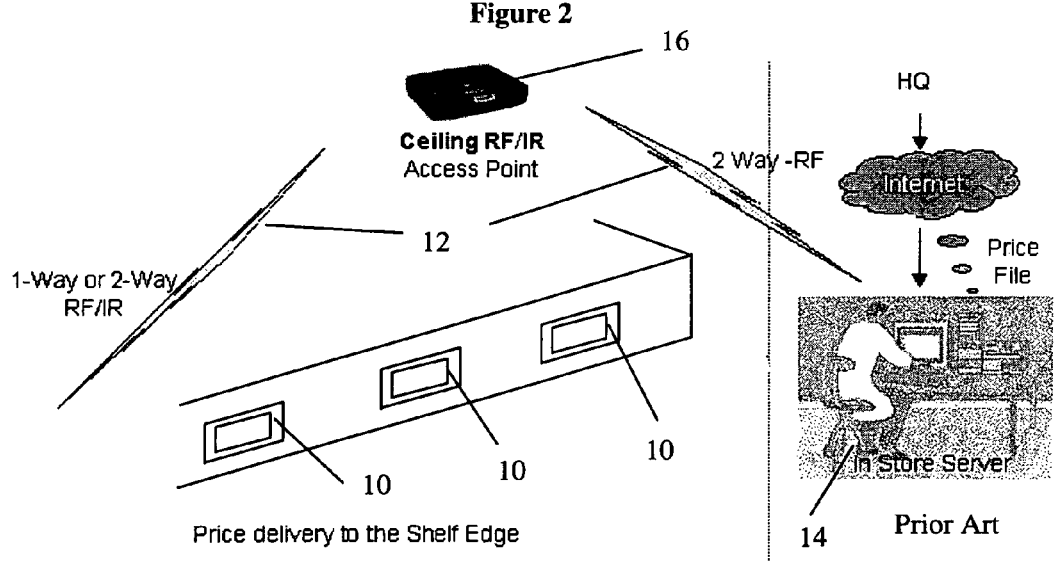
FIG. 2 shows how price information may be transferred from central computers to ESLs by RF or IR transmission.
Figure 3:
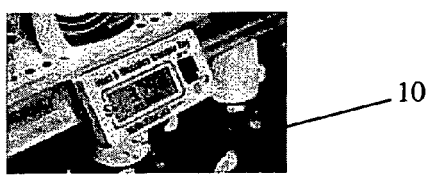
FIG. 3 shows a prior art ESL protruding from the C-channel mounting on a display shelf.
Figure 4:
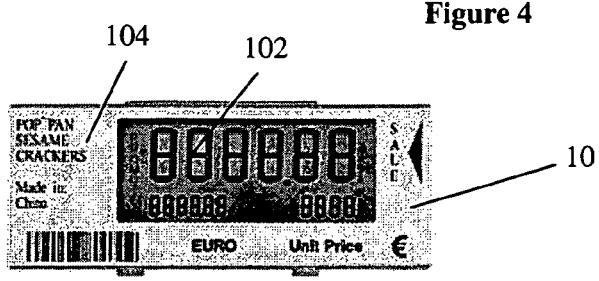
FIG. 4 shows a prior art ESL with a paper label attached for barcode and store operations information.
Figure 5:
FIG. 5 shows the rigid display format of a prior art ESL.
Figure 6:
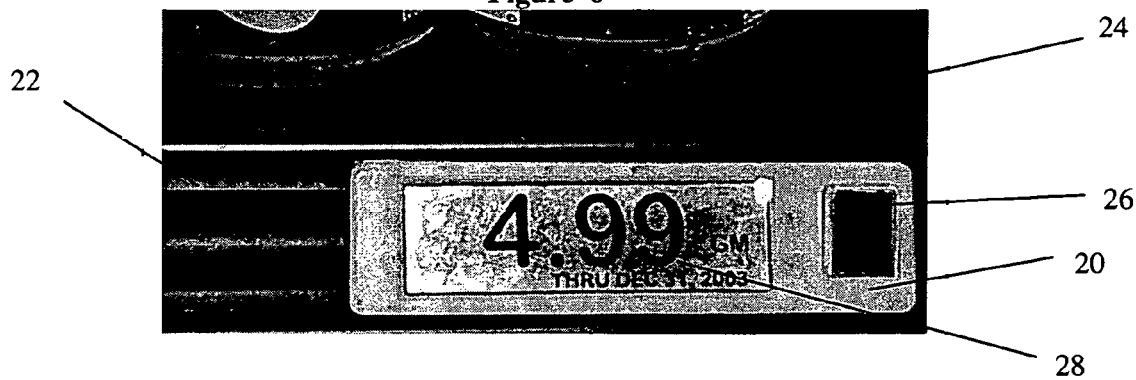
FIG. 6 shows the disclosed WDT fitted within the confines of a shelf C-channel.

Referring to FIG. 6, a wireless electronic labeling device 20 may display text and graphics in a form factor capable of unobtrusively replacing printed shelf-edge paper labels and sales or inventory tags that are attached to movable items within a controlled area. The wireless electronic labeling device or "Wireless Display Tag" (WDT) 20 may be located in the shelf-edge C-channel 22 of a display shelf 24 located within a retail store.

The WDT 20 may include a combined active transceiver and backscatter communications system as disclosed in the concurrently filed U.S. Provisional Patent Application titled "Wireless Display Tag (WDT) Using Active and Backscatter Transceivers," incorporated herein by reference. The WDT 20 may be initialized using a system and method for matching the ID of the WDT 20 to the proper product located on a specific shelf space using an error-free process as disclosed in the concurrently filed U.S. Provisional Patent Application titled "An Poor Free Method for Wireless Display Tag Initialization."

Figure 7:
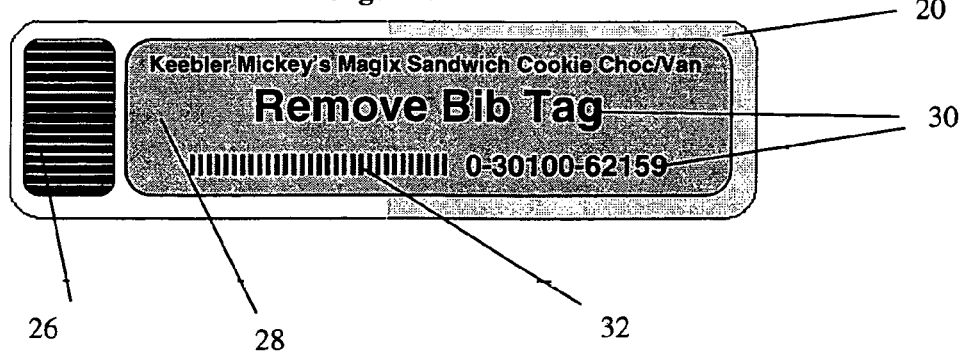
FIG. 7 shows the display surface of the disclosed WDT.
Figure 8:
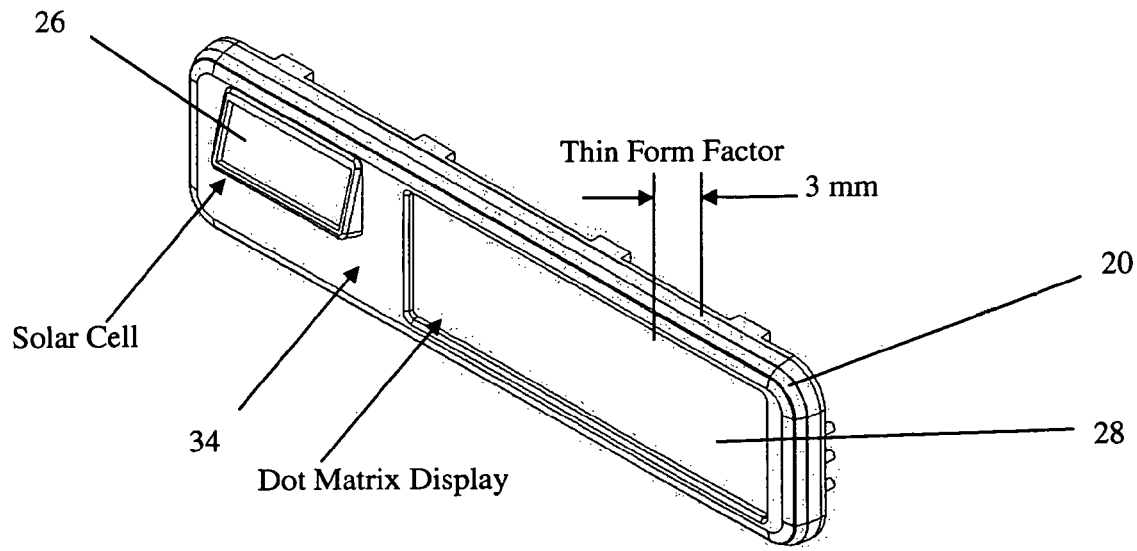
FIG. 8 shows the display area and profile of the disclosed WDT of FIG. 6.

Referring now to FIG. 6, FIG. 7 and FIG. 8, the WDT 20 may include a solar cell 26 and a dot-matrix display 28 capable of displaying various graphical representations, including alphanumeric data 30 and barcodes 32.

Figure 9:
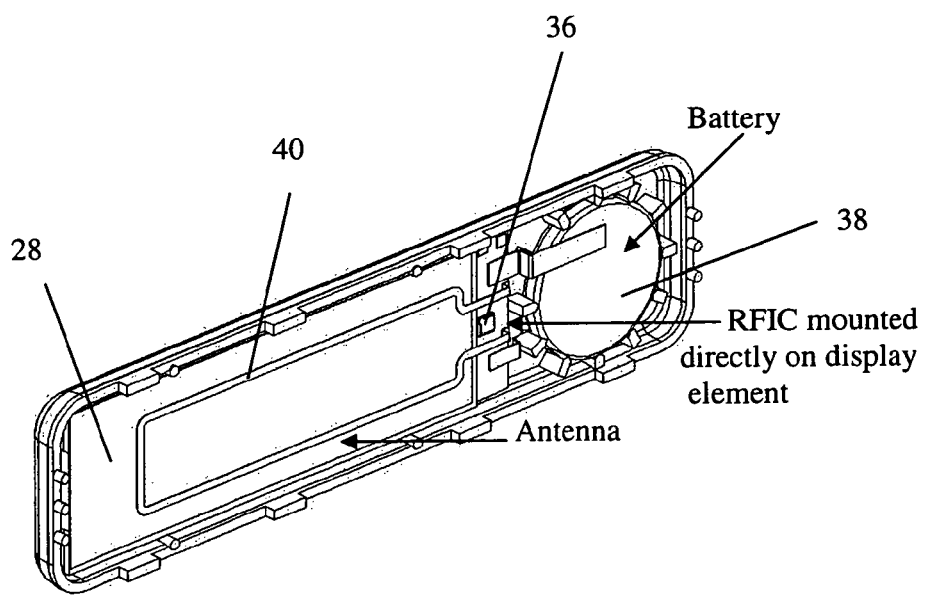
FIG. 9 shows the interior of the WDT of FIG. 6, behind the display area, showing the placement of various elements of the WDT.

Referring now to FIG. 8 and FIG. 9, the dot-matrix display 28 and the solar cell 26 may be located on the front-facing surface 34 of the WDT 20. The solar cell 26 may be the primary power source supplying the dot-matrix display panel.

With reference to FIG. 9, the WDT 20 may also include a radio frequency (RF) integrated circuit (RFIC) 36 that enables the WDT to communicate wirelessly in a bidirectional manner with an in-store computer system. The WDT 20 may include a zero direct current power RF backscatter transceiver as disclosed in the concurrently filed U.S. Provisional Patent Application titled "RF Backscatter Transmission with Zero DC Power Consumption," incorporated herein by reference. The RFIC 36 may combine active transceiver and backscatter communications as disclosed in the concurrently filed U.S. Provisional Patent Application "Wireless Display Tag (WDT) Using Active and Backscatter Transceivers."

Referring to FIG. 9, the RFIC 36 may be mechanically and electrically coupled to the back of the dot-matrix display 28 and powered by a battery 38. The RFIC 36 may transmit and receives electromagnetic signals using an RF antenna 40. The RF antenna 40 may be a low-profile antenna enclosed within the WDT 20. Various embodiments utilize an RF antenna created by etching a metallic surface or by "painting" the antenna onto an available surface.

Figure 10:
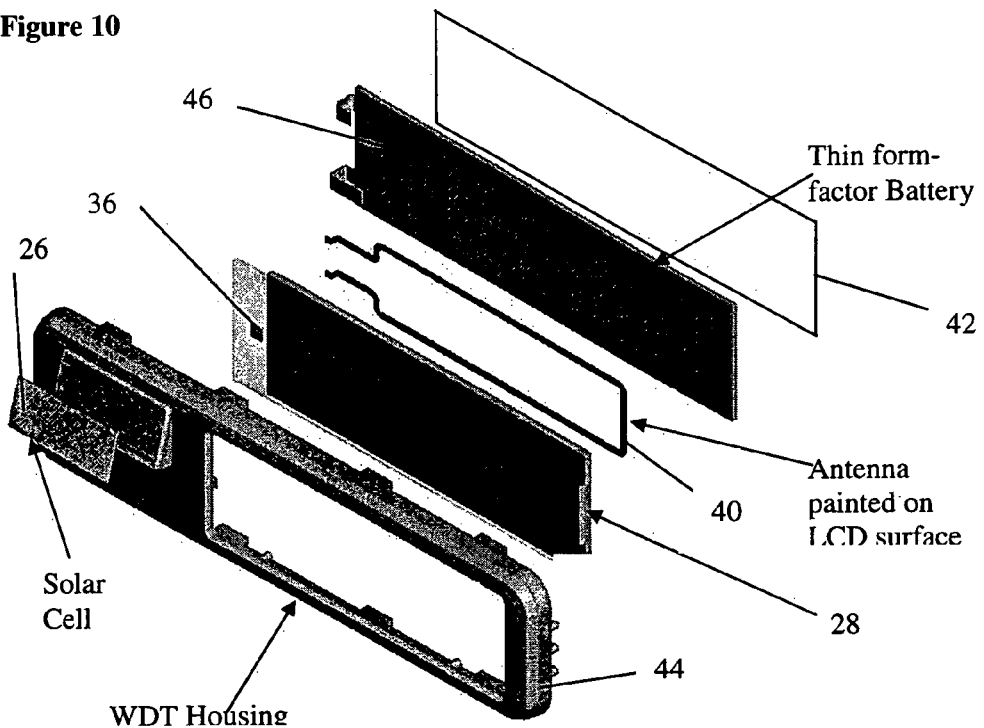
FIG. 10 is an exploded perspective view of the disclosed WDT components showing the relative positions of the various elements of the WDT.

FIG. 10 shows the relative position of components within an embodiment of the invention. An enclosure may be formed by matingly joining a rear housing 42 and a front housing 44. Within the enclosure, a thin-form battery 46, RF antenna 40, RFIC 36, a front-mounted solar cell 26 and a dot-matrix display panel 28 may be mechanically and electrically coupled. Alternative embodiments may utilize an RF antenna that is painted or etched onto the face of the front or rear housing 42.

Figure 11:
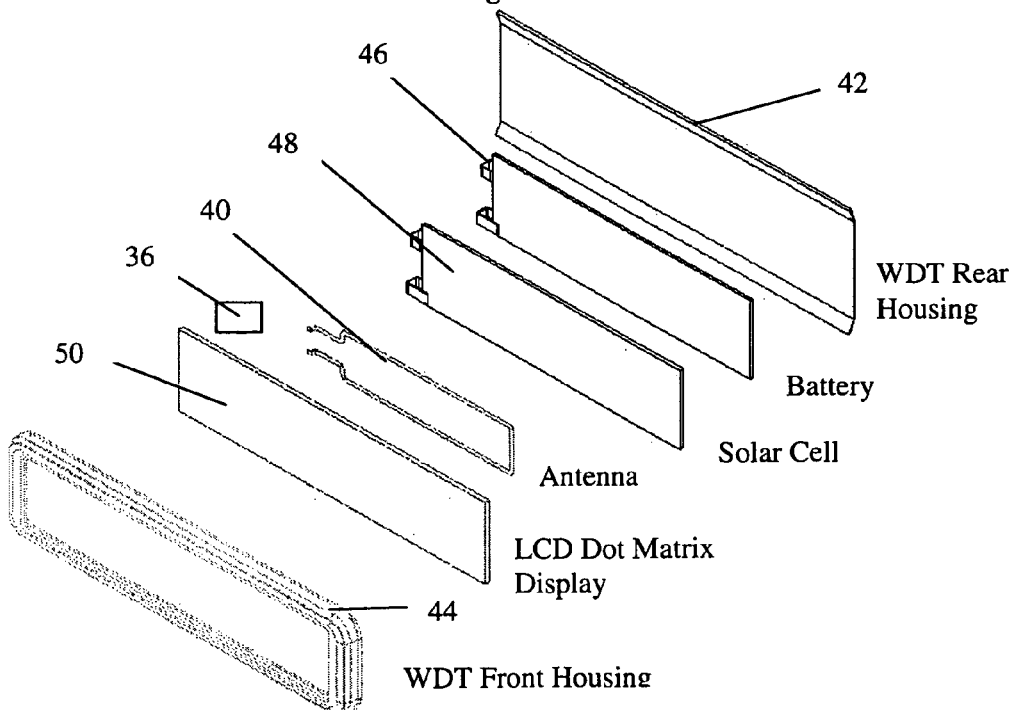
FIG. 11 is an exploded perspective view of an alternate embodiment of a WDT, showing the relative positions of the various elements of the WDT where the display surface is extended to the edges of the WDT.

Referring now to FIG. 11, another embodiment of the invention may extend the dot-matrix display 50 to the edges of the WDT front housing 44. An enclosure may be formed by matingly joining a rear housing 42 and a front housing 44. Within the enclosure, a thin-form battery 46, an internally mounted solar cell 48, an RF antenna 40, an RFIC 36 and an LCD dot-matrix display panel 50 may be mechanically and electrically coupled. The internally mounted solar cell 48 may generate power by absorbing light passing through the LCD dot-matrix display panel 50. By extending the LCD dot-matrix display panel to occupy the whole viewable surface of the WDT, multiple WDTs may be juxtaposed to create a larger configurable display area. Thus, one skilled in the art would be able to construct a matrix of WDTs to form a compound display as needed or required by shelf format and content.

Referring again to FIG. 6, FIG. 7, FIG. 10 and FIG. 11, both the dot-matrix display 28, and 50 are capable of displaying alphanumeric characters 30 and graphics data. Character font size and shapes are programmable within the WDT. A wide variety of graphical forms may be displayed, including barcodes 32 and special symbols.

Figure 12:
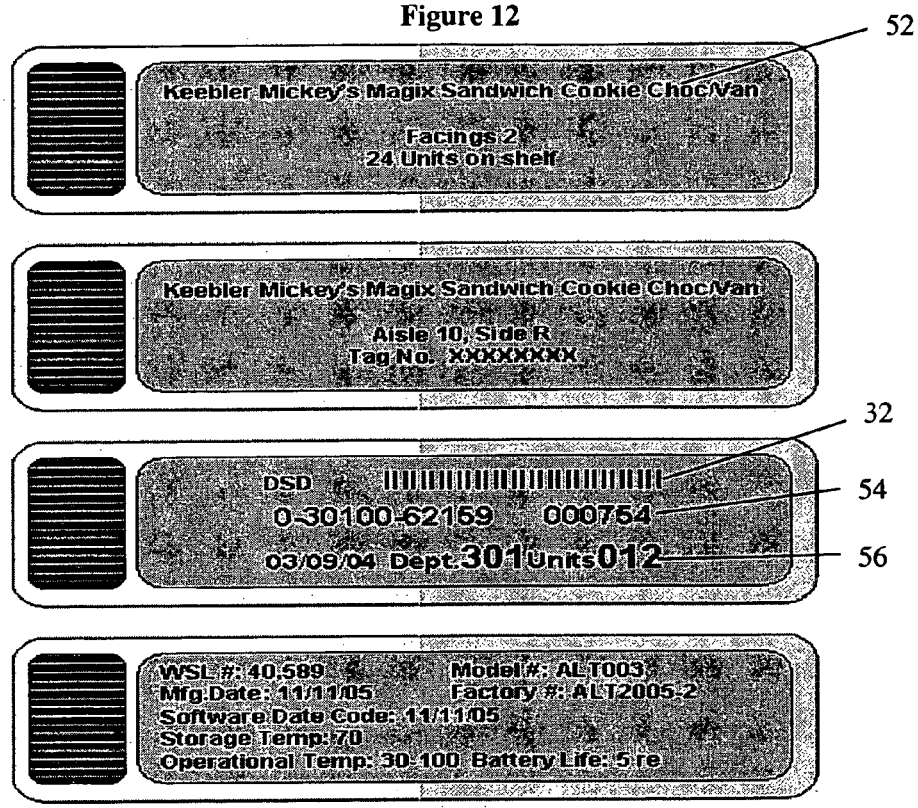
FIG. 12 shows the flexibility of display format and placement of the WDT of FIG. 6 or FIG. 11.

The illustration in FIG. 12 shows the information that may be displayed on a WDT, including a mix of upper and lower case characters 52, barcode data 32, enlarged font size 54, and enlarged, bold font types 56. Barcodes may be read by commercial barcode reading systems. Alternative embodiments of the invention include color dot-matrix displays.

Referring again to FIG. 10 and FIG. 11, the solar cell 26, and 48 facilitates power management by permitting the WDT to reduce power consumption independent of the in-store central controller. Because the solar cell 26, and 48 may produce power in proportion to the intensity of light falling upon its photoactive surface, low light conditions may be detected by the WDT and the device may disable the display. The solar cell 26, and 48 may provide power for the display panel 28, 50 and parts of the RFIC 36. The RFIC 36 contains digital logic, volatile memory, display driver circuitry and analog RF circuitry. The solar cell may supply power to the digital logic, the volatile memory and the display driver circuitry in the RFIC 36. In low light conditions, the battery 46 may supply power to the digital logic and volatile memory in the RFIC 36. The battery may also supply power to the analog RF circuitry in the RFIC 36.

The RFIC 36 may be recognized by in-store control and pricing systems using an identification code (ID) that is stored in the volatile memory of the RFIC 36. In some embodiments, the battery 46 ensures that the RFIC 36 and its internal memory are powered continuously regardless of light conditions. The in-store control and pricing systems may correlate and update the WDT using a system and method for matching numerous electronic displays to the proper product located on a specific shelf space using an error-free process for initialization of the WDT as disclosed in the concurrently filed U.S. Provisional Patent Application "An Error Free Method for Wireless Display Tag Initialization."

Figure 13:
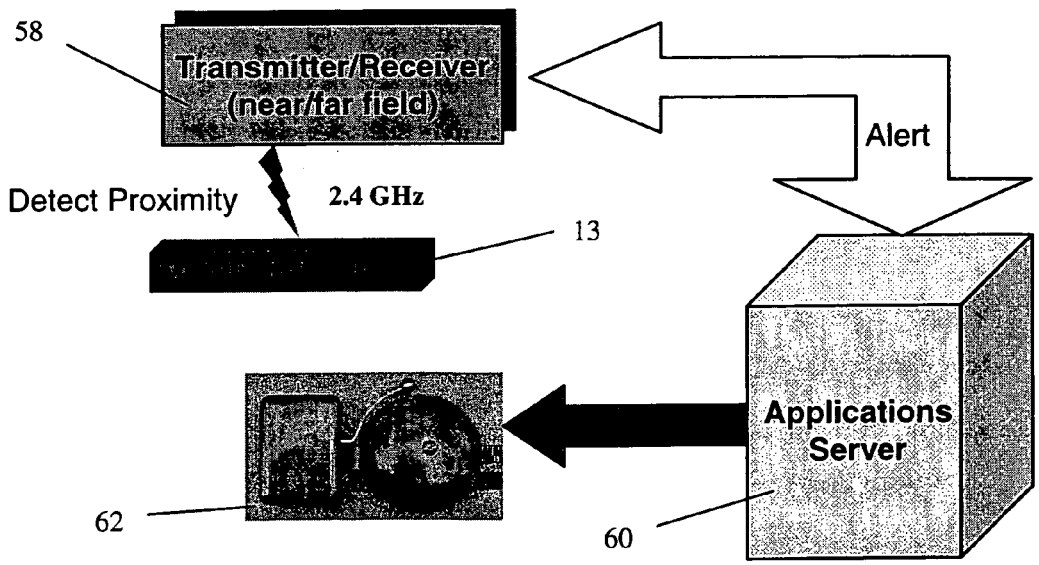
FIG. 13 shows use of the WDT as an anti-theft device.

Referring now to FIG. 13, in various embodiments, WDTs may be used as anti-theft devices because they contain an RFIC that can be readily identified and located in the store. In such embodiments, the WDT may be attached to an item to be used as a price or inventory tag and may display a variety of information, including price, stock or inventory numbers and barcodes. Additionally, in some embodiments, the passive backscatter capability of the WDT permits its use as a transponder that responds on demand to a poll by a near-field RF transmitter/receiver 58. The transmitter/receiver 58 may report the presence of the WDT RFIC to a central applications server 60 that tracks the presence or absence of monitored WDT RFIC 36, thereby enabling theft detection and activation of anti-theft measures such as an alarm 62.

Figure 14:
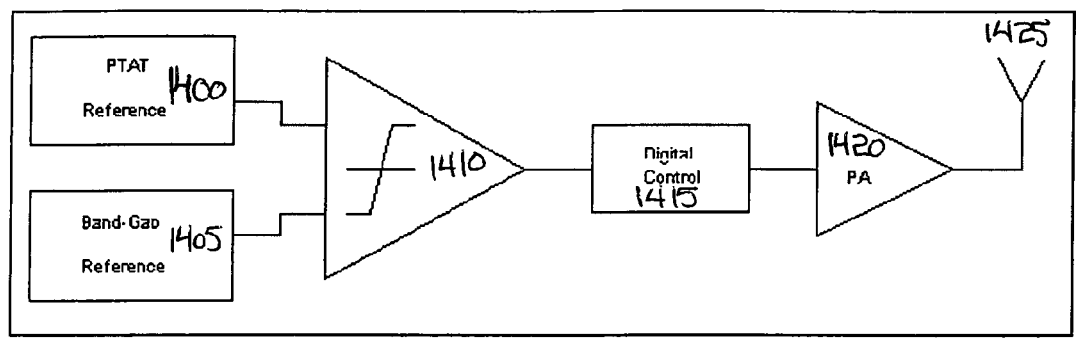
FIG. 14 illustrates in schematic block diagram form a WDT having an environmental sensor, for example a temperature sensor, built therein.

Depending upon the implementation, the WDT can also include environmental sensors that monitor temperature, humidity and other environmental factors. For example, FIG. 14 shows an implementation of a temperature sensor in a WDT. The PTAT reference 1400 is compared to a band-gap reference 1405 by a thresholding amplifier 1410, which provides an input to digital control logic 1415. The output of the logic provides the input to a power amplifier 1420, from which a signal is sent to the antenna 1425. Thus, if the environmental conditions move outside the pre-determined limits, such that an alarm condition exists, the WDT can transmit via RF that alarm condition to a central computer.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

We claim:

1. A wireless display tag comprising:
    a housing configured to fit either within a shelf-edge C-channel, or in a rail;
    a programmable dot matrix display within the housing for displaying inventory information,
    an integrated circuit within the housing operatively connected to the display and adapted for bidirectional wireless communication with a remote host using an RF backscatter transceiver;
    a low profile antenna within the housing operatively connected to the integrated circuit; and
    environmental sensors for sensing at least one of a group which includes light, temperature and humidity.

2. The wireless display tag of claim 1, wherein the integrated circuit provides active communications for relatively long range and passive communication for relatively short range.

3. The wireless display tag of claim 2 wherein the passive communication uses RF backscatter.

4. The wireless display tag of claim 1 wherein the display tag fits either within a shelf-edge C-channel, or in a rail.

5. The wireless display tag claim 4 further adapted to read RFID tags on items within a predetermined vicinity, and to provide to a host system selected data from such RFID tags.

6. The wireless display tag of claim 1 further includes environmental sensors for sensing at least one of a group which includes light, temperature and humidity.

7. The wireless display tag of claim 4 further including ports accessible by external devices.

8. The wireless display tag of claim 7 wherein the port is a hardware interface.

9. The wireless display tag of claim 1, wherein the integrated circuit is further adapted to receive information from RFID devices within a local area and to retransmit information from such other RFID devices to the host using RF backscatter.

10. The wireless display tag of claim 9 wherein the display tag fits either within a shelf-edge C-Channel, or in a rail of retail store shelving.

11. The wireless display tag of claim 1, wherein the integrated circuit provides location-determining information to a host system.

12. The wireless display tag of claim 1 further comprising an interface for responding to queries from a host system for providing real-time inventory counting and location-determining information.

13. The wireless display tag of claim 1 wherein the display is a high contrast, high resolution dot matrix display capable of displaying bar codes and being scanned by a conventional bar code reader.

14. The wireless display tag of claim 1 wherein the display is a high contrast, high resolution segmented display capable of displaying bar codes and being scanned by a conventional bar code reader.

15. The wireless display of claim 1 wherein the integrated circuit includes a display driver capable of driving a dot matrix display or a segmented display.

16. The wireless display tag of claim 1 wherein the integrated circuit is capable of entering and exiting a low power sleep mode.

17. The wireless display tag of claim 6 wherein the integrated circuit is adapted to disable the display in response to low light conditions in response to input from the environmental sensor.

18. A processor adapted for use in a wireless display tag comprising:
    display processor for driving a programmable dot matrix display to display information about an item intended to be associated with the display tag;
    RF circuitry for communicating bidirectionally with a remote host, directly or indirectly, using backscatter RF and at least one communications technology selected from a group comprising passive RF and active RF; and
    mesh networking and display tag logic providing at least two functions selected from a group comprising real time location identification, real time path tracking, anti-theft signaling, inventory counting, inventory tracking, environmental sensing, and RFID.

19. The processor of claim 18 wherein the RF circuitry includes at least two of the communications technologies.

20. The processor of claim 18 wherein the display tag logic provides RFID and inventory tracking.

21. The processor of claim 18 wherein the display tag logic provides RFID and inventory counting.

22. The processor of claim 18 wherein the display tag logic provides RFID and path tracking.

23. The processor of claim 18 wherein the RF circuitry includes passive backscatter.

24. The processor of claim 18 wherein the RF circuitry includes both passive and active RF circuitry.

* * * * *